US011267192B2

(12) United States Patent
Achten et al.

(10) Patent No.: US 11,267,192 B2
(45) Date of Patent: Mar. 8, 2022

(54) LAYERED MANUFACTURING PROCESS FOR AN OBJECT WITH DIFFERENT LAYER MATERIAL AND OBJECT WITH DIFFERENT LAYER MATERIAL

(71) Applicant: Covestro Deutschland AG, Leverkusen (DE)

(72) Inventors: Dirk Achten, Leverkusen (DE); Thomas Büsgen, Leverkusen (DE); Peter Reichert, Dormagen (DE); Nicolas Degiorgio, Krefeld (DE); Rolf Wehrmann, Krefeld (DE); Helmut Werner Heuer, Siegen (DE); Eckhard Wenz, Cologne (DE)

(73) Assignee: Covestro Deutschland AG, Leverkusen (DE)

( * ) Notice: Subject to any disclaimer, the term of this patent is extended or adjusted under 35 U.S.C. 154(b) by 341 days.

(21) Appl. No.: 16/474,176

(22) PCT Filed: Dec. 22, 2017

(86) PCT No.: PCT/EP2017/084287
§ 371 (c)(1),
(2) Date: Jun. 27, 2019

(87) PCT Pub. No.: WO2018/122143
PCT Pub. Date: Jul. 5, 2018

(65) Prior Publication Data
US 2019/0344497 A1  Nov. 14, 2019

(30) Foreign Application Priority Data
Dec. 28, 2016 (EP) .................................... 16207131

(51) Int. Cl.
| | | |
|---|---|---|
| *B29C 64/118* | (2017.01) | |
| *B29C 64/153* | (2017.01) | |
| *C08G 64/04* | (2006.01) | |
| *B33Y 10/00* | (2015.01) | |
| *B33Y 70/00* | (2020.01) | |
| *B33Y 80/00* | (2015.01) | |
| *B29K 25/00* | (2006.01) | |
| *B29K 27/06* | (2006.01) | |
| *B29K 33/00* | (2006.01) | |
| *B29K 67/00* | (2006.01) | |
| *B29K 69/00* | (2006.01) | |
| *B29K 75/00* | (2006.01) | |
| *B29K 77/00* | (2006.01) | |

(52) U.S. Cl.
CPC .......... *B29C 64/118* (2017.08); *B29C 64/153* (2017.08); *C08G 64/04* (2013.01); *B29K 2025/06* (2013.01); *B29K 2027/06* (2013.01); *B29K 2033/08* (2013.01); *B29K 2033/12* (2013.01); *B29K 2067/00* (2013.01); *B29K 2069/00* (2013.01); *B29K 2075/00* (2013.01); *B29K 2077/00* (2013.01); *B33Y 10/00* (2014.12); *B33Y 70/00* (2014.12); *B33Y 80/00* (2014.12)

(58) Field of Classification Search
CPC ... B29C 64/118; B29C 64/153; B29C 64/106; C08G 64/04; B33Y 10/00; B33Y 70/00; B33Y 80/00
See application file for complete search history.

(56) References Cited

U.S. PATENT DOCUMENTS

| | | |
|---|---|---|
| 2,991,273 A | 7/1961 | Hechelhammer et al. |
| 2,999,825 A | 9/1961 | Floyd et al. |
| 2,999,846 A | 9/1961 | Schnell et al. |
| 3,028,365 A | 4/1962 | Schnell et al. |
| 3,148,172 A | 9/1964 | Fox |
| 3,271,367 A | 9/1966 | Schnell et al. |
| 3,879,348 A | 4/1975 | Serini et al. |
| 4,946,535 A | 8/1990 | Meckel et al. |
| 4,982,014 A | 1/1991 | Freitag et al. |
| 9,573,024 B2 * | 2/2017 | Bender .............. A63B 37/0076 |

(Continued)

FOREIGN PATENT DOCUMENTS

| | | |
|---|---|---|
| DE | 1570703 A1 | 2/1970 |
| DE | 2036052 A1 | 1/1972 |
| DE | 2063050 A1 | 7/1972 |
| DE | 2211956 A1 | 10/1973 |
| DE | 2901774 A1 | 7/1980 |

(Continued)

OTHER PUBLICATIONS

International Search Report for PCT/EP2017/084287 dated Mar. 16, 2018.

(Continued)

*Primary Examiner* — Nahida Sultana
(74) *Attorney, Agent, or Firm* — Jed C. Benson

(57) ABSTRACT

A method for producing an object with layers of different materials in an additive manufacturing process comprises the following steps: •I) providing a construction material heated at least in part to a temperature above its glass transition temperature on a substrate, so that a layer of the construction material is obtained which corresponds to a first selected cross section of the object; •II) providing a construction material heated at least in part to a temperature above its glass transition temperature on a previously provided layer of the construction material, so that another layer of the construction material is obtained which corresponds to another selected cross section of the object and which is connected to the previously provided layer; •III) repeating step II) until the object is formed. In the individual steps II) in the method, the construction material is selected each time from a first construction material and a second construction material different from the first, the first construction material being a polycarbonate, polyester, polyester carbonate, polyimide, polylactic acid, polyvinyl chloride, polystyrene, polymethyl(meth)acrylate or mixtures of at least two thereof. Step II) is carried out at least once with the first construction material and step II) is carried out at least once with the second construction material. The invention further relates to an object that is obtainable using the method described above.

14 Claims, No Drawings

(56) References Cited

U.S. PATENT DOCUMENTS

| | | | | |
|---|---|---|---|---|
| 2017/0072105 A1* | 3/2017 | Jeffries | .................. | A61L 27/54 |
| 2019/0263067 A1* | 8/2019 | Lee | ........................ | B29C 64/20 |
| 2020/0189180 A1* | 6/2020 | Bihari | ..................... | C08L 69/00 |
| 2020/0377729 A1* | 12/2020 | Bihari | ..................... | C08G 81/00 |

FOREIGN PATENT DOCUMENTS

| | | |
|---|---|---|
| DE | 3832396 A1 | 2/1990 |
| EP | 0192946 A1 | 9/1986 |
| FR | 1561518 A | 3/1969 |
| GB | 1122003 A | 7/1968 |
| GB | 1229482 A | 4/1971 |
| GB | 1367790 A | 9/1974 |
| JP | S6162039 A | 3/1986 |
| JP | S6162040 A | 3/1986 |
| JP | S61105550 A | 5/1986 |
| WO | WO-2015065826 A1 | 5/2015 |
| WO | WO-2015077053 A1 | 5/2015 |
| WO | WO-2015102774 A1 | 7/2015 |
| WO | WO-2015195527 A1 | 12/2015 |

OTHER PUBLICATIONS

Written Opinion of the International Searching Authority for PCT/EP2017/084287 dated Mar. 16, 2018.

* cited by examiner

LAYERED MANUFACTURING PROCESS FOR AN OBJECT WITH DIFFERENT LAYER MATERIAL AND OBJECT WITH DIFFERENT LAYER MATERIAL

CROSS-REFERENCE TO RELATED APPLICATIONS

This application is a national stage application (under 35 U.S.C. § 371) of PCT/EP2017/084287, filed Dec. 22, 2017, which claims benefit of European Application No. 16207131.0, filed Dec. 28, 2016, both of which are incorporated herein by reference in their entirety.

The present invention relates to a process for producing an article in an additive manufacturing method with layers of different materials, comprising the steps of:
I) providing a construction material heated at least to a temperature above its glass transition temperature on a carrier, such that a layer of the construction material is obtained, corresponding to a first selected cross section of the article;
II) providing a construction material heated at least partly to a temperature above its glass transition temperature on a previously provided layer of the construction material, such that a further layer of the construction material is obtained, corresponding to a further selected cross section of the article and bonded to the previously provided layer;
III) repeating step II) until the article is formed.

The invention likewise relates to an article obtainable by the process of the invention.

The use of polycarbonates in additive manufacturing methods ("3D printing methods") is known in principle. For instance, WO 2015/077053 A1 discloses an article having reduced density, comprising a thermoplastic polycarbonate composition. The article has a density (ASTM D792-00) of 80% to 99%, based on the weight of a similar solid injection molding without voids. In addition, the article has a microstructure, determined by optical microscopy, with 1% by volume to 20% by volume of voids, wherein at least 80% of the voids are those having a high ratio of length to width and less than 20% by weight of the voids are spherical cavities having a diameter between 10 and 100 micrometers. The thermoplastic polycarbonate composition comprises at least 50 mol % bisphenol A and has weight-average molecular weight ($M_w$) of 10 000 to 50 000, a glass transition temperature Tg of 130° C. to 180° C., a content of phenolic OH groups of less than 50 ppm, a halogen group content of below 100 ppm and a diaryl carbonate content of less than 1% by weight. The article is manufactured by means of a monofilament-based additive manufacturing technique.

WO 2015/195527 A1 relates to a process for producing a thermoplastic article in which a multitude of layers of a thermoplastic material is laid out in a predetermined pattern in order to form the article. The thermoplastic material comprises a thermoplastic composition having a melt flow index of 30 grams/10 minutes to 75 grams/10 minutes to ASTM D1238-07 at either 230° C. at 3.8 kg or at 300° C. and 1.2 kg. The thermoplastic material may be a polycarbonate homopolymer, a polycarbonate copolymer, a polyester or a combination thereof.

Polycarbonates have a low degree of crystallinity, a comparatively high melting temperature and a glass transition temperature well above room temperature. However, this combination of properties entails specific challenges for the use of polycarbonates in additive manufacturing methods. These are especially the adhesion of individual strand or particle layers to one another.

It is an object of the present invention to at least partly overcome at least one disadvantage of the prior art. It is a further object of the present invention to specify an additive manufacturing method by which polycarbonate-based construction materials can be processed with improved adhesion of the individual layers to one another.

The object is achieved in accordance with the invention by a process as claimed in claim 1. An article obtainable by the process of the invention is claimed in claim 10. Advantageous developments are specified in the subsidiary claims. They may be combined as desired, unless the opposite is apparent from the context.

A process for producing an article in an additive manufacturing method with layers of different materials comprises the steps of:
I) providing a construction material heated at least to a temperature above its glass transition temperature on a carrier, such that a layer of the construction material is obtained, corresponding to a first selected cross section of the article;
II) providing a construction material heated at least partly to a temperature above its glass transition temperature onto a previously provided layer of the construction material, such that a further layer of the construction material is obtained, corresponding to a further selected cross section of the article and bonded to the previously provided layer;
III) repeating step II) until the article is formed.

In the process, the construction material in each of the individual steps II) is selected from a first construction material or a second construction material different therefrom, where the first construction material comprises a polycarbonate, polyester, polyestercarbonate, polyamide, polylactide, polyvinylchloride, polystyrene, polymethyl (meth)acrylate or mixtures of at least two of these, step II) is conducted at least once with the first construction material and step II) is conducted at least once with the second construction material.

According to the invention, the article is produced by means of the additive manufacturing method ("3D printing") from a construction material. The additive manufacturing method is preferably selected from the group consisting of melt layering (fused filament fabrication, FFF, or fused deposition modeling, FDM)) selective laser sintering, selective laser melting and high-speed sintering or a combination of at least two of these.

The term "melt coating method" refers to a manufacturing method from the field of additive manufacturing, with which a workpiece is formed layer by layer, for example from a fusible plastic. The plastic may be used with or without further additions such as fibers. Machines for FDM/FFF form part of the machine class of 3D printers. This method is based on the liquefaction of a plastic or wax material in wire form by heating. The material solidifies in the course of final cooling. The material is applied by extrusion with a heating nozzle which is freely movable in relation to a manufacturing plane. It is possible here either for the manufacturing plane to be fixed and for the nozzle to be freely movable or for a nozzle to be fixed and a substrate table (with a manufacturing plane) to be moved, or for both elements, the nozzle and manufacturing plane, to be movable. The speed with which the substrate and nozzle are movable with respect to one another is preferably within a range from 1 to 200 mm/s. According to the application, the layer thickness is within a range from 0.025 and 1.25 mm, and the exit diameter of the jet of material (nozzle outlet diameter) of the nozzle is typically at least 0.05 mm.

In layer-by-layer model production, the individual layers are thus bonded to form a complex part. A body is typically constructed by repeatedly tracing a working plane line by line (forming a layer) and then moving the working plane upward in a "stacking" manner (forming at least one further layer atop the first layer), so as to form a shape layer by layer. The exit temperature of the mixtures of matter from the nozzle may, for example, be 80° C. to 420° C., and even briefly higher up to about 450° C. It is additionally possible to heat the substrate table, for example to 20° C. to 250° C. This can prevent excessively rapid cooling of the layer applied, such that a further layer applied thereto bonds adequately to the first layer.

In the context of the present invention, sintering methods are methods which especially utilize thermoplastic powders in order to construct articles layer by layer. In this case, by means of what is called a coater, thin layers of powder are applied and then selectively melted by means of an energy source. The surrounding powder here supports the component geometry. Complex geometries can thus be manufactured more economically than in the FDM method. Moreover, different articles can be arranged or manufactured in a tightly packed manner in what is called the powder bed. Owing to these advantages, powder-based additive manufacturing methods are among the most economically viable additive manufacturing methods on the market. They are therefore the processes that are predominantly used by industrial users. Examples of powder-based additive manufacturing processes are so-called selective laser sintering (SLS) or high-speed sintering (HSS). They differ from one another in the method for introducing into the plastic the energy for the selective melting. In the laser sintering method, the energy is introduced via a deflected laser beam. In what is called the high-speed sintering (HSS) method, the energy is introduced via infrared (IR) sources in combination with an IR absorber selectively printed into the powder bed. What is called selective heat sintering (SHS) utilizes the printing unit of a conventional thermal printer in order to selectively melt thermoplastic powders. Preference is given to selective laser sintering methods (SLS).

According to the invention, the first construction material is different than the second construction material. The construction materials may differ from one another in chemical terms and/or in their physical properties. For instance, within one substance class, for example that of the polycarbonates, two different materials may be selected for the first and second construction materials.

The second construction material may differ from the first construction material in that it is optionally semicrystalline and has a glass transition temperature of more than 50° C. (preferably more than 70° C., more preferably more than 90° C.) below the glass transition temperature of the first construction material. It is also possible that that construction material which has the lower glass transition temperature has a melting point of >10° C. (preferably >25° C., most preferably >40° C.) above the melting point of the construction material having the higher glass transition temperature.

The construction materials used may be transparent, translucent or opaque. The transparency of each of the first and second construction materials, preferably in the visible region for a sheet of thickness 1 mm, is above 60%, preferably above 70% and more preferably above 80%. The elements index of transparent construction materials is preferably below 20, preferably below 15, more preferably below 10.

The process of the invention can be conducted with any construction space and the temperature of the construction space is preferably ≥10° C., or preferably ≥20° C., or preferably ≥30° C., lower than the glass transition temperature $T_g$ of the first construction material (determined by DSC to DIN EN ISO 11357 at a heating rate 10° C./min). Particularly in the case of complex and large components with long manufacturing time, this is associated with distinctly lower thermal stress and better trueness of the component to scale. The construction space temperature is preferably ≤140° C., or preferably ≤130° C. and more preferably ≤120° C.

As well as the construction space temperature, a factor may be the temperature of the construction base in the process of the invention on which the first layer is printed. The temperature of the construction base in this connection is preferably greater than the glass transition temperature of at least one of the construction materials.

In the context of the present invention, polycarbonate polymers usable in the first construction material are either homopolycarbonates or copolycarbonates; polycarbonates may be linear or branched in a known manner. According to the invention, it is also possible to use mixtures of polycarbonates. The polycarbonates may be aromatic, aliphatic or mixed aromatic/aliphatic polycarbonate polymers. The polycarbonates are prepared in a known manner from dials, carbonic acid derivatives, and optionally chain terminators and branching agents.

Details of the production of polycarbonates have been set out in many patent specifications. Reference may be made here to Schnell, "Chemistry and Physics of Polycarbonates", Polymer Reviews, Volume 9, Interscience Publishers, New York, London, Sydney 1964, to D. Freitag, U. Grigo, P. R. Müller, H. Nouvertne, BAYER A G, "Polycarbonates" in Encyclopedia of Polymer Science and Engineering, Volume 11, Second Edition, 1988, pages 648-718 and finally to U. Grigo, K. Kirchner and P. R. Müller "Polycarbonate" [Polycarbonates] in Becker/Braun, Kunststoff-Handbuch [Plastics Handbook], volume 3/1, Polycarbonate, Polyacetale, Polyester, Celluloseester [Polycarbonates, Polyacetals, Polyesters, Cellulose Esters], Carl Hanser Verlag Munich, Vienna 1992, pages 117-299. Aromatic polycarbonates are prepared, for example, by reacting diphenols with carbonic halides, preferably phosgene, and/or with aromatic dicarbonyl dihalides, preferably benzenedicarbonyl dihalides, by the interfacial process, optionally using chain terminators and optionally using trifunctional or more than trifunctional branching agents. Preparation via a melt polymerization process by reaction of diphenols with diphenyl carbonate, for example, is likewise possible.

Diphenols suitable for the preparation of polycarbonates are, for example, hydroquinone, resorcinol, dihydroxydiphenyls, bis(hydroxyphenyl)alkanes, bis(hydroxyphenyl)cycloalkanes, bis(hydroxyphenyl) sulfides, bis(hydroxyphenyl) ethers, bis(hydroxyphenyl) ketones, bis(hydroxyphenyl) sulfones, bis(hydroxyphenyl) sulfoxides, α,α'-bis(hydroxyphenyl)diisopropylbenzenes, phthalimidines derived from isatin derivatives or from phenolphthalein derivatives, and also the related ring-alkylated, ring-arylated and ring-halogenated compounds. Preferred diphenols are 4,4'-dihydroxydiphenyl, 2,2-bis(4-hydroxyphenyl)propane (bisphenol A), 2,4-bis(4-hydroxyphenyl)-2-methylbutane, 1,1-bis(4-hydroxyphenyl)-p-diisopropylbenzene, 2,2-bis(3-methyl-4-hydroxyphenyl)propane, dimethylbisphenol A, bis(3,5-dimethyl-4-hydroxyphenyl)methane, 2,2-bis(3,5-dimethyl-4-hydroxyphenyl)propane, bis(3,5-dimethyl-4-hydroxyphenyl)sulfone, 2,4-bis(3,5-dimethyl-4-hydroxyphenyl)-2-methylbutane, 1,1-bis(3,5-dimethyl-4-hydroxyphenyl)-p-diisopropylbenzene and 1,1-bis(4-hydroxyphenyl)-3,3,5-trimethylcyclohexane.

Particularly preferred diphenols are 2,2-bis(4-hydroxyphenyl)propane (bisphenol A), 2,2-bis(3,5-dimethyl-4-hydroxyphenyl)propane, 1,1-bis(4-hydroxyphenyl)cyclohexane, 1,1-bis(4-hydroxyphenyl)-3,3,5-trimethylcyclohexane and dimethylbisphenol A. These and other suitable diphenols are described, for example, in U.S. Pat. Nos. 3,028,635, 2,999,825, 3,148,172, 2,991,273, 3,271,367, 4,982,014 and 2,999,846, in DE-A 1 570 703, DE-A 2 063 050, DE-A 2 036 052, DE-A 2 21 1 95 and DE-A 3 832 396, in FR-A 1 561 518, in the monograph "H. Schnell, Chemistry and Physics of Polycarbonates, Interscience Publishers, New York 1964" and also in JP-A 62039/1986, JP-A 62040/1986 and JP-A 105550/1986.

Suitable aliphatic diols are especially those of the formula H[O-T-]$_n$-OH where n is a number from 1 100, preferably 1 to 80 and more preferably 1 to 45, and T is a branched or linear, saturated or unsaturated alkyl or cycloalkyl moiety having 3 to 20 carbon atoms. Preference is given to saturated linear alkyl diols having 3 to 15 carbon atoms, more preferably having 3-10 carbon atoms, even more preferably having 6-10 carbon atoms and especially also 7-10 carbon atoms.

Nonexclusive examples include heptane-1,7-diol, octane-1,8-diol, hexane-1,6-diol, pentane-1,5-diol, butane-1,4-diol, propane-1,3-diol, 2-methylpropane-1,3-diol, 3-methylpentane-1,5-diol, 2-methylpentanediol, 2,2,4-trimethylhexane-1,6-diol, 2-ethylhexane-1,6-diol, 2,3,5-trimethylhexane-1,6-diol, cyclohexanedimethanol, neopentyl glycol and polyethylene glycol, polypropylene glycol, polybutylene glycol and polyether polyols that have been obtained by copolymerization of ethylene oxide and propylene oxide, for example, or polytetramethylene glycol that has been obtained by ring-opening polymerization of tetrahydrofuran (THF), di-, tri- and tetrahexyl ether glycol, and mixtures of different diols.

In addition, it is possible to use addition products of the diols with lactones (ester diols), for example caprolactone, valerolactam, etc., and mixtures of the diols with lactones, with no need for any initial transesterification of lactones and diols.

It is also possible to use the addition products of the diols described as dicarboxylic acids, for example: adipic acid, glutaric acid, malonic acid etc., or esters of the dicarboxylic acids and mixtures of the diols with dicarboxylic acids or esters of the dicarboxylic acids, with no need for any initial transesterification of dicarboxylic acid and the diols. It is also possible to use mixtures of different diols, lactones and dicarboxylic acids.

Aliphatic diols used are preferably hexane-1,6-diol, pentane-1,5-diol and mixtures of hexane-1,6-diol and caprolactone.

Only one diol is used in the case of the homopolycarbonates; at least two different diols are used in the case of copolycarbonates.

Examples of suitable carbonic acid derivatives include phosgene or diphenyl carbonate.

Suitable chain terminators that may be used in the preparation of the polycarbonates are monophenols. Examples of suitable monophenols include phenol itself, alkylphenols such as cresols, p-tert-butylphenol, cumylphenol and mixtures of at least two of these. Preferred chain terminators are the phenols mono- or polysubstituted by linear or branched C1- to C30-alkyl radicals, preferably unsubstituted or tert-butyl-substituted. Particularly preferred chain terminators are phenol, cumylphenol and/or p-tert-butylphenol.

The amount of chain terminator to be used is preferably 0.1 to 5 mol %, based on moles of diols used in each case. The chain terminators can be added before, during or after the reaction with a carbonic acid derivative.

Suitable branching agents are the trifunctional or more than trifunctional compounds familiar in polycarbonate chemistry, in particular those having three or more than three phenolic OH groups. Examples of suitable branching agents include 1,3,5-tri(4-hydroxyphenyl)benzene, 1,1,1-tri(4-hydroxyphenyl)ethane, tri(4-hydroxyphenyl)phenylmethane, 2,4-bis(4-hydroxyphenylisopropyl)phenol, 2,6-bis(2-hydroxy-5'-methylbenzyl)-4-methylphenol, 2-(4-hydroxyphenyl)-2-(2,4-dihydroxyphenyl)propane, tetra(4-hydroxyphenyl)methane, tetra(4-(4-hydroxyphenylisopropyl)phenoxy) methane and 1,4-bis((4',4''-dihydroxytriphenyl)methyl) benzene and 3,3-bis(3-methyl-4-hydroxyphenyl)-2-oxo-2,3-dihydroindole.

The amount of any branching agents to be used is preferably 0.05 mol % to 2.00 mol %, based on moles of diols used in each case.

The branching agents can either be initially charged with the diols and the chain terminators in the aqueous alkaline phase or added dissolved in an organic solvent prior to the phosgenation. In the case of the transesterification process, the branching agents are used together with the diols.

Particularly preferred polycarbonates are the homopolycarbonate based on bisphenol A, the homopolycarbonate based on 1,1-bis(4-hydroxyphenyl)-3,3,5-trimethylcyclohexane and the copolycarbonates based on the two monomers bisphenol A and 1,1-bis(4-hydroxyphenyl)-3,3,5-trimethylcyclohexane.

For incorporation of additives, the polycarbonate powder is preferably used in the form of powders, granules or mixtures of powders and granules. The construction material may also comprise further additives such as fillers, stabilizers and the like, but also further polymers. The total content of additives in the construction material may, for example, be ≥0.1% by weight to ≤10% by weight, preferably ≥1% by weight to ≤5% by weight.

In steps I) and II) of the process of the invention, a construction material heated at least partly to a temperature above its glass transition temperature is provided. The glass transition temperature of the materials can be ascertained by DSC to DIN EN ISO 11357 at heating rate of 10° C./min. The heating can be effected, for example, to preferably ≥1° C. to ≤200° C., preferably ≥10° C. to ≤150° C., above the glass transition temperature of the materials. In cases in which the second construction material comprises an at least partly crystalline polymer (for example a thermoplastic polyurethane), preference is given to heating to a temperature within the melting range or above the melting point of the polymer.

According to the invention, moreover, step II) is conducted at least once with the first construction material and step II) is conducted at least once with the second construction material. In this way, a composite of different layers can be constructed. How often step II) is conducted with the first construction material and how often step II) is conducted with the second construction material is fundamentally not fixed. It is likewise left open to the user of the process to determine the individual sequence of layers with the first construction material and with the second construction material. This may be guided by the function of the article to be produced.

In the process of the invention, it is of course possible to use more than two different construction materials. Thus, in each of the individual steps II), the construction material may be selected from a first construction material, a second construction material and a third construction material that are each different from one another. In that case, step II) is conducted at least once with the first construction material, once with the second construction material and once with the third construction material. Analogously, in each of the individual steps II), the construction material may be selected from a first construction material, a second construction material, a third construction material and a fourth construction material that are each different from one another. In that case, step II) is conducted at least once with the first construction material, once with the second construction material, once with the third construction material and once with the fourth construction material. It is also true of these more than two different construction materials that they need not be selected from different polymer classes, but such that they differ merely in a feature such as melting point, crystallinity or some other measurable property.

It is also possible in the process of the invention that one layer of the body to be produced is constructed from more than one construction material. In that case, for example, first and second construction materials are present alongside one another.

In a preferred embodiment of the process, in steps I) and II), the providing of a construction material needed at least partly to a temperature above its glass transition temperature is effected by applying a filament of at least one construction material heated at least partly to a temperature above its glass transition temperature. This embodiment is a melt coating or fused deposition modelling (FDM) method. Preference is given to using a device that can process the first construction material and the second construction material in separate printheads. More particularly, the production of the article by means of the additive manufacturing method may comprise the steps of:

applying a filament of a construction material heated at least partly to a temperature above its glass transition temperature to a carrier to obtain a layer of the construction material corresponding to a first selected cross section of the article;

applying a filament of the construction material heated at least partly to a temperature above its glass transition temperature to a previously applied layer of the construction material to obtain a further layer of the construction material which corresponds to a further selected cross section of the article and which is bonded to the previously provided layer;

repeating the step of applying a filament of the construction material heated at least partly to a temperature above its glass transition temperature to a previously applied layer of the construction material until the article has been formed.

In this context, the construction material used is the first or second construction material, for example in each case in alternation, as construction material in the sense of the steps described above. Preferably, the number of layers of the first construction material may, however, also differ from the number of layers of the second construction material or every further construction material.

If the number of repetitions for the applying is sufficiently low, it is also possible to make reference to a two-dimensional article which is to be constructed. Such a two-dimensional article can also be characterized as a coating. Preferably, for construction thereof, $\geq 1$ to $\leq 20$ repetitions for the applying may be conducted.

The individual filaments which are applied preferably have a diameter of $\geq 30$ μm to $\leq 2000$ μm, or preferably of $\geq 40$ μm to $\leq 1000$ μm and more preferably of $\geq 50$ μm to $\leq 500$ μm.

The first step (I) relates to the construction of the first layer on a carrier. Subsequently, the second step (II), in which further layers are applied to previously applied layers of the construction material, is executed until the desired end result in the form of the article is obtained. The at least partly molten construction material bonds to existing layers of the previously applied construction material in order to form a structure in z direction.

In a further preferred embodiment of the process, in steps I) and II), the providing of a construction material needed at least partly to a temperature above its glass transition temperature is effected by the action of energy on a powder layer of the construction material. More particularly, the production of the article by means of the additive manufacturing method may comprise the steps of:

applying a layer of particles including the construction material to a target surface;

introducing energy into a selected portion of the layer corresponding to a cross section of the article such that the particles in the selected portion are bonded;

repeating the steps of applying and introducing energy for a multitude of layers, such that the bonded portions of the adjacent layers become bonded in order to form the article.

This embodiment involves a powder sintering or powder fusion method. If the number of repetitions for applying and irradiation is sufficiently low, it is also possible to make reference to a two-dimensional article which is to be constructed. Such a two-dimensional article can also be characterized as a coating. For example, for construction thereof, $\geq 2$ to $\leq 20$ repetitions for applying and irradiating may be conducted.

It is preferable that at least 90% by weight of the particles have a particle diameter of $\leq 0.25$ mm, preferably $\leq 0.2$ mm, more preferably $\leq 0.15$ mm. The energy source for bonding of the particles may be electromagnetic energy, for example UV to IR light. An electron beam is also conceivable. The bonding of the particles in the irradiated portion of the particle layer is typically effected through (partial) melting of a (semi-)crystalline material and bonding of the material in the course of cooling. Alternatively, it is possible that other transformations of the particles such as a glass transition, i.e. the heating of the material to a temperature above the glass transition temperature, bring about bonding of the particles to one another.

It is possible that the introducing of energy into a selected portion of the layer corresponding to a cross section of the article such that the particles in the selected portion are bonded comprises the following step:

irradiating a selected portion of the layer corresponding to a cross section of the article with a beam of energy, such that the particles in the selected portion are bonded.

This form of the method can be regarded as a selective sintering method, especially as a selective laser sintering method (SLS). The beam of energy for bonding of the particles may be a beam of electromagnetic energy, for example a "light beam" of UV to IR light. Preferably, the beam of energy is a laser beam, more preferably having a wavelength between 600 nm and 15 μm. The laser may take the form of a semiconductor laser or of a gas laser. An electron beam is also conceivable.

It is also possible that the introducing of energy into a selected portion of the layer corresponding to a cross section of the article such that the particles in the selected portion are bonded comprises the following steps:

applying a liquid to a selected portion of the layer corresponding to a cross section of the article, where said liquid increases the absorption of the energy introduced in the regions of the layer with which it comes into contact relative to the regions with which it does not come into contact;

irradiating the layer such that the particles in regions of the layer that come into contact with the liquid are bonded to one another and the particles in regions of the layer that do not come into contact with the liquid are not bonded to one another.

In this embodiment, for example, a liquid comprising an IR absorber can be applied to the layer by means of inkjet methods. The irradiation of the layer leads to selective heating of those particles that are in contact with the liquid including the IR absorber. In this way, bonding of the particles can be achieved. Optionally, it is additionally possible to use a second liquid complementary to the energy-absorbing liquid in terms of its characteristics with respect to the energy used. In regions in which the second liquid is applied, the energy used is not absorbed but reflected. The regions beneath the second liquid are thus shaded. In this way, the separation sharpness between regions of the layer that are to be melted and not to be melted can be increased.

In a further preferred embodiment of the process, the number of steps II) using the first construction material is ≥80% to ≤120% (preferably ≥90% to ≤110%) of the number of steps II) using the second construction material. In that case, the article to be produced is constructed in approximately equal parts from the first and second construction materials.

In a further preferred embodiment of the process, the first and second construction materials are used alternately in the steps II). In this way, an alternating layer sequence of the first and second construction materials is obtained.

In a further preferred embodiment of the process, the first construction material has a Vicat softening temperature to DIN EN ISO 306, determined with a testing force of 50 N and a heating rate of 120 K/h (Vicat B/120), of ≥150° C. to ≤220° C. This temperature is preferably ≥160° C. to ≤205° C., more preferably ≥170° C. to ≤195° C.

In a further preferred embodiment of the process, the second construction material has a Vicat softening temperature to DIN EN ISO 306, determined with a testing force of 50 N and a heating rate of 120 K/h (Vicat B/120), of ≥100° C. to ≤170° C. This temperature is preferably ≥110° C. to ≤160° C., more preferably ≥120° C. to ≤150° C.

In a further preferred embodiment of the process, the first construction material comprises a polycarbonate polymer having diphenol units derived from 4,4'-(3,3,5-trimethylcyclohexylidene)bisphenol (bisphenol TMC). Preference is given to a polycarbonate polymer comprising diphenol units derived from bisphenol TMC and from bisphenol A. Such polymers are commercially available under the Apec® name from Covestro AG, Leverkusen, Germany. Based on the molar amount of diphenols used, the polycarbonate polymer may comprise, for example, ≥5 mol % to ≤95 mol %, ≥10 mol % to ≤85 mol % or ≥20 mol % to ≤65 mol % of diphenol units derived from bisphenol TMC. The difference from 100 mol % of diphenol units is preferably formed by diphenol units derived from bisphenol A.

In a further preferred embodiment of the process, the second construction material comprises a polymer selected from the group of: a polyamide, a polyurethane, a polyester, a polyestercarbonate, a polyformal, a polyether, a polyimide, a polyetherketone, a polycarbonate, a polyacrylate, a polyolefin, a polyvinylchloride, a polyoxymethylene and mixtures and/or copolymers of at least two of these. Preference is given to thermoplastic elastomers (TPE), thermoplastic polyurethane (TPU), polycarbonate (PC), polyamide (PA), polyethylene terephthalate (PET), polybutylene terephthalate (PBT), cycloolefinic copolyester (COC), polyether ether ketone (PEEK), polyether amide ketone (PEAK), polyetherimide (PEI), polyimide (PI), polypropylene (PP) or polyethylene (PE), acrylonitrile butadiene styrene (ABS), polylactate (PLA), polymethyl methacrylate (PMMA), polystyrene (PS), polyvinyl chloride (PVC), polyoxymethylene (POM), polyacrylonitrile (PAN), polyacrylate or celluloid. Preference is given to TPU or PC, and reference is made to the above remarks with regard to the details of polycarbonate is for avoidance of unnecessary repetition. Particular preference is given to the case that the second construction material comprises a polycarbonate having diphenol units derived from 4,4'-(1-methylethylidene)bisphenol (bisphenol A).

In a further preferred embodiment of the process, the second construction material comprises a thermoplastic polyurethane polymer.

In a further preferred embodiment of the process, the construction material comprises a thermoplastic polyurethane elastomer having a melting range (DSC, differential scanning calorimetry; second heating at a heating rate of 5 K/min) of ≥20° C. to ≤240° C. (preferably ≥40° C. to ≤220° C., more preferably ≥70° C. to ≤200° C.), and a Shore hardness to DIN ISO 7619-1 of ≥40 A to ≤85 D (preferably ≥50 Shore A to ≤80 Shore D, more preferably ≥60 Shore A to ≤75 Shore D).

In this DSC analysis, the material is subjected to the following temperature cycle: 1 minute at minus 60° C., then heating to 240° C. at 20 kelvin/minute, then cooling to minus 60° C. at 5 kelvin/minute, then 1 minute at minus 60° C., then heating to 240° C. at 20 kelvin/minute.

In a further preferred embodiment of the process, the second construction material comprises a thermoplastic polyurethane elastomer having a melting range (DSC, differential scanning calorimetry; second heating at heating rate 5 K/min) of ≥20° C. to ≤240° C. (preferably ≥40° C. to ≤220° C., more preferably ≥70° C. to ≤200° C.), and a Shore hardness according to DIN ISO 7619-1 to ≥40 A to ≤85 D (preferably ≥50 Shore A to ≤80 Shore D, more preferably ≥60 Shore A to ≤75 Shore D).

In this DSC analysis too, the material is subjected to the following temperature cycle: 1 minute at minus 60° C., then heating to 240° C. at 20 kelvin/minute, then cooling to minus 60° C. at 5 kelvin/minute, then 1 minute at minus 60° C., then heating to 240° C. at 20 kelvin/minute.

In a further preferred embodiment of the process, the second construction material comprises a thermoplastic polyurethane elastomer obtainable from the reaction of the following components:

a) at least one organic diisocyanate b) at least one compound having isocyanate-reactive groups and having a number-average molecular weight ($M_n$) of ≥500 g/mol to ≤6000 g/mol and a number-average functionality of the sum total of the components b) of ≥1.8 to ≤2.5 c) at least one chain extender having a molecular weight (Mn) of 60-450 g/mol and a number-average functionality of the sum total of the chain extenders c) of 1.8 to 2.5.

For synthesis of this thermoplastic polyurethane elastomer (TPU), specific examples of isocyanate components a)

include: aliphatic diisocyanates such as ethylene diisocyanate, 1,4-tetramethylene diisocyanate, 1,5-pentamethylene diisocyanate, 1,6-hexamethylene diisocyanate, 1,12-dodecane diisocyanate, cycloaliphatic diisocyanates such as isophorone diisocyanate, 1,4-cyclohexane diisocyanate, 1-methylcyclohexane 2,4-diisocyanate and 1-methylcyclohexane 2,6-diisocyanate and the corresponding isomer mixtures, 4,4'-dicyclohexylmethane diisocyanate, 2,4'-dicyclohexylmethane diisocyanate and 2,2'-dicyclohexylmethane diisocyanate and the corresponding isomer mixtures, and also aromatic diisocyanates such as 2,4-tolylene diisocyanate, mixtures of 2,4-tolylene diisocyanate and 2,6-tolylene diisocyanate, 4,4'-diphenylmethane diisocyanate, 2,4'-diphenylmethane diisocyanate and 2,2'-diphenylmethane diisocyanate, mixtures of 2,4'-diphenylmethane diisocyanate and 4,4'-diphenylmethane diisocyanate, urethane-modified liquid 4,4'-diphenylmethane diisocyanates or 2,4'-diphenylmethane diisocyanates, 4,4'-diisocyanate-1,2-diphenylethane and 1,5-naphthylene diisocyanate. Preference is given to using hexamethylene 1,6-diisocyanate, cyclohexane 1,4'-diisocyanate, isophorone diisocyanate, dicyclohexylmethane diisocyanate, diphenylmethane diisocyanate isomer mixtures having a diphenylmethane 4,4'-diisocyanate content of more than 96% by weight and especially diphenylmethane 4,4'-diisocyanate and naphthylene 1,5-diisocyanate. These diisocyanates can be used individually or in the form of mixtures with one another. They may also be used together with up to 15 mol % (based on total diisocyanate) of a polyisocyanate, but the maximum amount of polyisocyanate that may be added is such as to result in a product that is still thermoplastically processible. Examples of polyisocyanates are triphenylmethane 4,4',4"-triisocyanate and polyphenylpolymethylene polyisocyanates.

Examples of longer-chain isocyanate-reactive compounds covered by b) include those having on average at least 1.8 to 3.0 Zerewitinoff-active hydrogen atoms and a number-average molecular weight of 500 to 10 000 g/mol. This includes, in addition to compounds having amino groups, thiol groups or carboxyl groups, especially compounds having two to three, preferably two, hydroxyl groups, specifically those having number-average molecular weights Mn of 500 to 6000 g/mol, more preferably those having a number-average molecular weight Mn of 600 to 4000 g/mol, for example hydroxyl-containing polylactones, polyester polyols, polyether polyols, polycarbonate polyols and polyester polyamides. Suitable polyester diols can be prepared by reacting one or more alkylene oxides having 2 to 4 carbon atoms in the alkylene radical with a starter molecule containing two active hydrogen atoms in bonded form. Examples of alkylene oxides include: ethylene oxide, 1,2-propylene oxide, epichlorohydrin and 1,2-butylene oxide and 2,3-butylene oxide. Preference is given to using ethylene oxide, propylene oxide and mixtures of 1,2-propylene oxide and ethylene oxide. The alkylene oxides may be used individually, in alternating succession or as mixtures. Examples of useful starter molecules include water, amino alcohols such as N-alkyldiethanolamines, for example N-methyldiethanolamine, and diols such as ethylene glycol, 1,3-propylene glycol, butane-1,4-diol and hexane-1,6-diol. It is optionally also possible to use mixtures of starter molecules. Suitable polyether diols further include the hydroxyl-containing polymerization products of tetrahydrofuran. It is also possible to use trifunctional polyethers in proportions of 0% to 30% by weight, based on the bifunctional polyether diols, but at most in such an amount as to result in a product that is still therinoplastically processible. The essentially linear polyether diols preferably have number-average molecular weights n of 500 to 6000 g/mol. They may be used either individually or in the form of mixtures with one another.

Suitable polyester diols may be produced, for example, from dicarboxylic acids having 2 to 12 carbon atoms, preferably 4 to 6 carbon atoms, and polyhydric alcohols. Contemplated dicarboxylic acids include for example: aliphatic dicarboxylic acids such as succinic acid, glutaric acid, adipic acid, suberic acid, azelaic acid and sebacic acid, or aromatic dicarboxylic acids such as phthalic acid, isophthalic acid and terephthalic acid. The dicarboxylic acids may be used individually or as mixtures, for example in the form of a succinic, glutaric and adipic acid mixture. For preparation of the polyester diols, it may in some cases be advantageous to use, rather than the dicarboxylic acids, the corresponding dicarboxylic acid derivatives such as carboxylic diesters having 1 to 4 carbon atoms in the alcohol radical, carboxylic anhydrides or carbonyl chlorides. Examples of polyhydric alcohols include glycols having 2 to 10, preferably 2 to 6, carbon atoms, for example ethylene glycol, diethylene glycol, butane-1,4-diol, pentane-1,5-diol, hexane-1,6-diol, decane-1,10-diol, 2,2-dimethylpropane-1,3-diol, propane-1,3-diol or dipropylene glycol. Depending on the desired properties, the polyhydric alcohols may be used alone or in admixture with one another. Also suitable are esters of carbonic acid with the diols mentioned, especially those having 4 to 6 carbon atoms, such as butane-1,4-diol or hexane-1,6-diol, condensation products of ω-hydroxycarboxylic acids such as ω-hydroxycaproic acid, or polymerization products of lactones, for example optionally substituted ω-caprolactone. Polyester diols used are preferably ethanediol polyadipates, butane-1,4-diol polyadipates, ethanediol butane-1,4-diol polyadipates, hexane-1,6-diol neopentyl glycol polyadipates, hexane-1,6-diol butane-1,4-diol polyadipates, and polycaprolactones. The polyester diols preferably have number-average molecular weights Mn of 450 to 6000 g/mol and can be employed individually or in the form of mixtures with one another.

The chain extenders c) have an average of 1.8 to 3.0 Zerewitinoff-active hydrogen atoms and have a molecular weight of 60 to 450 g/mol. This is understood to mean not only compounds having amino groups, thiol groups or carboxyl groups, but also those having two to three, preferably two, hydroxyl groups.

Chain extenders used are preferably aliphatic diols having 2 to 14 carbon atoms, for example ethanediol, propane-1,2-diol, propane-1,3-diol, butane-1,4-diol, butane-2,3-diol, pentane-1,5-diol, hexane-1,6-diol, diethylene glycol and dipropylene glycol. Also suitable, however, are diesters of terephthalic acid with glycols having 2 to 4 carbon atoms, for example bis(ethylene glycol) terephthalate or bis(butane-1,4-diol) terephthalate, hydroxyalkylene ethers of hydroquinone, for example 1,4-di(b-hydroxyethyl)hydroquinone, ethoxylated bisphenols, for example 1,4-di(b-hydroxyethyl) bisphenol A, (cyclo)aliphatic diamines, such as isophoronediamine, ethylenediamine, propylene-1,2-diamine, propylene-1,3-diamine, N-methylpropylene-1,3-diamine, N,N'-dimethylethylenediamine and aromatic diamines such as tolylene-2,4-diamine, tolylene-2,6-diamine, 3,5-diethyltolylene-2,4-diamine or 3,5-diethyltolylene-2,6-diamine or primary mono-, di-, tri- or tetraalkyl-substituted 4,4'-diaminodiphenylmethanes. Chain extenders used with particular preference are ethanediol, butane-1,4-diol, hexane-1,6-diol, 1,4-di(β-hydroxyethyl)hydroquinone or 1,4-di(β-hydroxyethyl)bisphenol A. It is also possible to use mixtures of the abovementioned chain extenders.

In addition, relatively small amounts of triols may also be added.

Compounds that are monofunctional toward isocyanates, covered by f), can be used in proportions of up to 2% by weight, based on TPU, as what are called chain terminators. Suitable examples include monoamines such as butyl- and dibutylamine, octylamine, stearylamine, N-methylstearylamine, pyrrolidine, piperidine or cyclohexylamine, monoalcohols such as butanol, 2-ethylhexanol, octanol, dodecanol, stearyl alcohol, the various amyl alcohols, cyclohexanol and ethylene glycol monomethyl ether.

The isocyanate-reactive substances should preferably be chosen such that their number-average functionality does not significantly exceed two if thermoplastically processible polyurethane elastomers are to be prepared. If higher-functional compounds are used, the overall functionality should accordingly be lowered using compounds having a functionality of <2.

The relative amounts of isocyanate groups and isocyanate-reactive groups are preferably chosen such that the ratio is 0.9:1 to 1.2:1, preferably 0.95:1 to 1.1:1.

The thermoplastic polyurethane elastomers used in accordance with the invention preferably comprise, as auxiliaries and/or additives, up to a maximum of 50% by weight, based on the total amount of TPUs, of the customary auxiliaries and additives. Typical auxiliaries and additives are catalysis, antiblocking agents, inhibitors, pigments, colorants, flame retardants, stabilizers against ageing and weathering effects and against hydrolysis, light, heat and discoloration, plasticizers, lubricants and demolding agents, fungistatic and bacteriostatic substances, reinforcing agents and inorganic and/or organic fillers and mixtures of at least two of these.

Examples of the additives are lubricants, such as fatty acid esters, metal soaps thereof, fatty acid amides, fatty acid ester amides and silicone compounds, and reinforcing agents, for example fibrous reinforcing agents, such as inorganic fibres, which are produced according to the prior art and can also be provided with a size. Further details of the auxiliaries and additives mentioned can be found in the specialist literature, for example the monograph by J. H. Saunders and K. C. Frisch: "High Polymers", volume XVI, Polyurethane, parts 1 and 2, Interscience Publishers 1962 and 1964, Taschenbuch der Kunststoff-Additive [Handbook of Plastics Additives] by R. Gächter and H. Müller (Hanser Verlag Munich 1990), or DE-A 29 01 774.

Suitable catalysts are the customary tertiary amines known from the prior art, for example triethylamine, dimethylcyclohexylamine, N-methylmorpholine, N,N'-dimethylpiperazine, 2-(dimethylaminoethoxy)ethanol, diazabicyclo[2.2.2]octane and the like and also in particular organic metal compounds such as titanate esters, iron compounds or tin compounds such as tin diacetate, tin dioctoate, tin dilaurate or the dialkyltin salts of aliphatic carboxylic acids such as dibutyltin diacetate or dibutyltin dilaurate or the like. Preferred catalysts are organic metal compounds, in particular titanate esters, iron compounds and tin compounds. The total amount of catalysts in the TPUs used is generally about 0% to 5% by weight, preferably 0% to 2% by weight, based on the total amount of TPUs.

In a further preferred embodiment of the process, the second construction material comprises a thermoplastic polyurethane elastomer having a melting range (DSC, differential scanning calorimetry; 2nd heating at heating rate 5 K/min.) of $\geq 20°$ C. to $\leq 100°$ C. and a magnitude of the complex viscosity $|\eta^*|$ (determined by viscometry measurement in the melt with a plate/plate oscillation shear viscometer at 100° C. and an angular frequency of 1/s) of $\geq 10$ Pas to $\leq 1\,000\,000$ Pas.

This thermoplastic elastomer has a melting range of $\geq 20°$ C. to $\leq 100°$ C., preferably of $\geq 25°$ C. to $\leq 90°$ C. and more preferably of $\geq 30°$ C. to $\leq 80°$ C. In the DSC analysis for determination of the melting range, the material is subjected to the following temperature cycle: 1 minute at $-60°$ C., then heating to 200° C. at 5 kelvin/minute, then cooling to $-60°$ C. at 5 kelvin/minute, then 1 minute at $-60°$ C., then heating to 200° C. at 5 kelvin/minute.

It is possible that the temperature interval between the start of the melting operation and the end of the melting operation as determinable by the above DSC protocol is $\leq 20°$ C., preferably $\leq 10°$ C. and more preferably $\leq 5°$ C.

This thermoplastic elastomer further has a magnitude of complex viscosity $|\eta^*|$ (determined by viscometry measurement in the melt with a plate/plate oscillation viscometer according to ISO 6721-10 at 100° C. and an angular frequency of 1/s) of $\geq 10$ Pas to $\leq 1\,000\,000$ Pas. $|\eta^*|$ is preferably $\geq 100$ Pas to $\leq 500\,000$ Pas, more preferably $\geq 1000$ Pas to 200 000 Pas.

The magnitude of complex viscosity $|\eta^*|$ describes the ratio of the viscoelastic moduli G' (storage modulus) and G" (loss modulus) to the excitation frequency w in a dynamic-mechanical material analysis:

$$|\eta^*| = \sqrt{\left[\left(\frac{G'}{\omega}\right)^2 + \left(\frac{G''}{\omega}\right)^2\right]} = \frac{|G^*|}{\omega}$$

In a further preferred embodiment of the process, the construction material comprises a thermoplastic polyurethane elastomer obtainable from the reaction of a polyisocyanate component and a polyol component, said polyol component comprising a polyester polyol having a no-flow point (ASTM D5985) of $\geq 25°$ C. to $\leq 100°$ C.

Preferably, in the reaction to give this polyurethane, it is also possible to use diols from the molecular weight range of $\geq 62$ to $\leq 600$ g/mol as chain extenders.

This polyisocyanate component may comprise a symmetric polyisocyanate and/or a nonsymmetric polyisocyanate. Examples of symmetric polyisocyanates are 4,4'-MDI and HUI.

In the case of nonsymmetric polyisocyanates, the steric environment of one NCO group in the molecule is different from the steric environment of a further NCO group. One isocyanate group then reacts more quickly with isocyanate-reactive groups, for example OH groups, while the remaining isocyanate group is less reactive. One consequence of the asymmetric construction of the polyisocyanate is that the polyurethanes formed with these polyisocyanates also have a less linear structure.

Examples of suitable nonsymmetric polyisocyanates are selected from the group comprising: 2,2,4-trimethylhexamethylene diisocyanate, ethylethylene diisocyanate, nonsymmetric isomers of dicyclohexylmethane diisocyanate ($H_{12}$-MDI), nonsymmetric isomers of 1,4-diisocyanatocyclohexane, nonsymmetric isomers of 1,3-diisocyanatocyclohexane, nonsymmetric isomers of 1,2-diisocyanatocyclohexane, nonsymmetric isomers of 1,3-diisocyanatocyclopentane, nonsymmetric isomers of 1,2-diisocyanatocyclopentane, nonsymmetric isomers of 1,2-diisocyanatocyclobutane, 1-isocyanatomethyl-3-isocyanato-1,5,5-trimethylcyclohexane (isophorone diisocyanate, IPDI), 1-methyl-2,4-diisocyanatocyclohexane, 1,6-diisocyanato-2,2,4-trimethylhexane, 1,6-diisocyanato-2,4,4-trimethylhexane, 5-isocyanato-1-(3-isocyanatoprop-1-yl)-1,3,3-trimethylcyclohexane, 5-isocyanato-1-(4-isocyanatobut-1-yl)-1,3,3-trimethylcyclohexane, 1-isocyanato-2-(3-isocyanatoprop-1-yl)cyclohexane, 1-isocyanato-2-(2-isocyanatoeth-1-yl)cyclohexane, 2-heptyl-3,4-bis(9-isocyanatononyl)-1-pentylcyclohexane, norbornane diisocyanatomethyl, 2,4'-diphenylmethane diisocyanate (MDI), 2,4- and 2,6-tolylene diisocyanate (TDI), derivatives of the diisocyanates listed, especially dimerized or trimerized types, or a combination of at least two of these.

Preference is given to 4,4'-MDI or a mixture containing IPDI and HDI and/or PDI as the polyisocyanate component.

This polyol component comprises a polyester polyol having a no-flow point (ASTM D5985) of ≥25° C. to ≤100° C., preferably ≥35° C. to ≤70° C., more preferably ≥35° C. to ≤55° C. To determine the no-flow point, a test vessel containing the sample is set in slow rotation (0.1 rpm). A flexibly mounted measurement head dips into the sample and, on attainment of the no-flow point, moves away from its position as a result of the abrupt increase in viscosity; the resulting tilting motion triggers a sensor.

Examples of polyester polyols which can have such a no-flow point are reaction products of phthalic acid, phthalic anhydride or symmetric α,ω-$C_4$- to $C_{10}$-dicarboxylic acids with one or more $C_2$- to $C_{10}$-diols. They preferably have a number-average molecular weight $M_n$ of ≥400 g/mol to ≤6000 g/mol. Suitable diols are especially monoethylene glycol, butane-1,4-diol, hexane-1,6-diol and neopentyl glycol.

Preferred polyesterpolyols are specified hereinafter, stating their acid and diol components: adipic acid+monoethylene glycol; adipic acid+monoethylene glycol+butane-1,4-diol; adipic acid+butane-1,4-diol; adipic acid+hexane-1,6-diol+neopentyl glycol; adipic acid+hexane-1,6-diol; adipic acid+butane-1,4-diol hexane-1,6-diol; phthalic acid/anhydride monoethylene glycol trimethylolpropane; phthalic acid/anhydride+monoethylene glycol. Preferred polyurethanes are obtained from a mixture comprising IPDI and HDI as polyisocyanate component and a polyol component comprising an aforementioned preferred polyesterpolyol. Particular preference is given to the combination of a mixture comprising IPDI and HDI as polyisocyanate component with a polyesterpolyol formed from adipic acid+butane-1,4-diol+hexane-1,6-diol for formation of the polyurethanes.

It is further preferable that these polyester polyols have an OH number (DIN 53240) of ≥25 to ≤170 mg KOH/g and/or a viscosity (75° C., DIN 51550) of ≥50 to ≤5000 mPas.

One example is a polyurethane obtainable from the reaction of a polyisocyanate component and a polyol component, where the polyisocyanate component comprises an HDI and IPDI and where the polyol component comprises a polyesterpolyol which is obtainable from the reaction of a reaction mixture comprising adipic acid and also hexane-1, 6-diol and butane-1,4-diol with a molar ratio of these diols of ≥1:4 to ≤4:1 and which has a number-average molecular weight $M_n$ (GPC, against polystyrene standards) of ≥4000 g/mol to ≤6000 g/mol. Such a polyurethane may have a magnitude of complex viscosity |n*| (determined by viscometry measurement in the melt with a plate/plate oscillation viscometer according to ISO 6721-10 at 100° C. and an angular frequency of 1/s) of ≥4000 Pas to ≤160 000 Pas.

A further example of a suitable polyurethane is:

1. Substantially linear polyester polyurethanes having terminal hydroxylgroups as described in EP 0192946 A1, prepared by reaction of
   a) polyester diols of molecular weight above 600 and optionally
   b) diols from the molecular weight range from 62 to 600 g/mol as chain extenders with
   c) aliphatic diisocyanates,
   observing an equivalents ratio of hydroxyl groups of components a) and b) to isocyanate groups of component c) of 1:0.9 to 1:0.999, where component a) consists to an extent of at least 80% by weight of polyester diols from the molecular weight range of 4000 to 6000 based on (i) adipic acid and (ii) mixtures of 1,4-dihydroxybutane and 1,6-dihydroxyhexane in a molar ratio of the diols of 4:1 to 1:4.

In the polyester polyurethanes mentioned under 1, it is preferable that component a) consists to an extent of 100% of a polyester diol of the molecular weight range from 4000 to 6000, the preparation of which involved using, as diol mixture, a mixture of 1,4-dihydroxybutane and 1,6-dihydroxyhexane in a molar ratio of 7:3 to 1:2.

In the polyester polyurethanes mentioned under 1, it is also preferable that component c) comprises IPDI and also HDI.

In the polyester polyurethanes mentioned under 1, it is also preferable that the preparation thereof involved also using, as component b), alkanediols selected from the group consisting of: 1,2-dihydroxyethane, 1,3-dihydroxypropane, 1,4-dihydroxybutane, 1,5-dihydroxypentane, 1,6-dihydroxyhexane or a combination of at least two of these in an amount of up to 200 hydroxyl equivalent percent based on component a).

It is also possible that the thermoplastic elastomer, after heating to 100° C. and cooling to 20° C. at a cooling rate of 4° C./min, within a temperature interval from 25° C. to 40° C. for ≥1 minute (preferably ≥1 minute to ≤30 minutes, more preferably ≥10 minutes to ≤15 minutes), has a storage modulus G' (determined at the respective temperature with a plate/plate oscillation viscometer according to ISO 6721-10 at an angular frequency of 1/s) of ≥100 kPa to ≤1 MPa and, after cooling to 20° C. and storage for 20 minutes, has a storage modulus G' (determined at 20° C. with a plate/plate oscillation viscometer according to ISO 6721-10 at an angular frequency of 1/s) of ≥10 MPa.

In a further preferred embodiment of the process, the absolute difference in the refractive indices $n^{20}_D$ between the first and second construction materials is ≥0.01. This achieves light-scattering effects in a desirable manner in the article produced, especially when there are alternating layers of first and second construction material. This difference is preferably ≥0.02, more preferably >0.03.

A further aspect of the present invention is an article obtainable by the process of the invention, comprising layers of a first construction material and a second construction material, where the first construction material is a polycarbonate polymer and the second construction material is different than the first construction material, and wherein the article, in construction direction of the additive manufacturing method used in its production, has a tensile strength (ISO 527) of ≥30% to ≤100% (preferably ≥40%, more preferably ≥50%) of the tensile strength (ISO 527) of an injection-molded specimen made from that construction material selected from the first construction material and the second construction material which has the lower tensile strength. These tensile strengths in the additively manufactured article thus relate to the adhesion of individual layers of the construction material to one another. Preferably, there is at least partial alternation of layers of the first and second construction materials in the article.

It is further preferable that the first construction material comprises a polycarbonate polymer having diphenol units derived from 4,4'-(3,3,5-trimethylcyclohexylidene)bisphenol (bisphenol TMC). Preference is given to a polycarbonate polymer comprising diphenol units derived from bisphenol TMC and from bisphenol A. Such polymers are commercially available under the Apec® name from Covestro AG, Leverkusen, Germany. Based on the molar amount of diphenols used, the polycarbonate polymer may comprise, for example, ≥5 mol % to ≤95 mol %, ≥10 mol % to ≤85 mol % or ≥20 mol % to ≤65 mol % of diphenol units derived from bisphenol TMC. The difference from 100 mol % of diphenol units is preferably formed by diphenol units derived from bisphenol A.

It is further preferable that the second construction material comprises a polycarbonate having diphenol units derived from bisphenol A. It is also possible that the second construction material comprises a thermoplastic polyurethane as described above.

EXAMPLES

The present invention is elucidated further by the examples which follow, but without being restricted thereto.

Example 1: Printing of Specimens for the Tensile Test

The first construction material used was a filament produced from the polycarbonate (PC) Makrolon® 3D1000, sourced from Covestro Deutschland AG. The second construction material used was a filament produced from the thermoplastic polyurethane Desmopan® 9385 A (TPU1), sourced from Covestro Deutschland AG. The diameter of the filaments of each of the two construction materials was 1.75 mm.

5 test specimens in the form of S2 tensile specimens (ISO 527) were produced from the construction materials with a Prusa i3 MK2S 3D printer from Prusa Research s.r.o. The test specimens were printed standing upright, meaning that the layers are deposited at right angles to the direction of tension. The test specimens were printed with the first construction material up to half the height (37.5 mm). Subsequently, the second halves of the test specimens were printed with the second construction material. The printing conditions for the two construction materials are as follows:

|  | Nozzle temperature | Substrate temperature | Deposition rate | Nozzle diameter | Layer thickness of the individual layer |
|---|---|---|---|---|---|
| PC | 285° C. | 90° C. | 30 mm/s | 0.4 mm | 0.15 mm |
| TPU1 | 240° C. | 90° C. | 24 mm/s | 0.4 mm | 0.15 mm |

Example 2: Tensile Test on the Test Specimens

The test specimens made from the construction materials PC and TPU1 according to example 1 were tested in a tensile test (to ISO 527) with the Z1.0 1 kN Zwicki tensile tester from Zwick Roell until fracture. In the subsequent examination of the broken test specimens, it was found that the fracture occurred not at the interface of the two construction materials but in all cases within one construction material.

It can be concluded from this that the interlayer adhesion between the two construction materials is higher than the interlayer adhesion of one construction material.

Example 3: Printing of Specimens for the Peel Test

The following construction materials were used for the peel test:
TPU2: Desmopan® DP 3690 AU thermoplastic polyurethane, Shore A 93, Shore D 40.
PC: Makrolon® 3D1000.

Both materials were sourced from Covestro Deutschland AG. The diameter of the filaments of each of the two construction materials was 1.75 mm. An FDM printer of the Prusa i3 MK2S type from Prusa Research s.r.o. with the following process conditions was used:

|  | Deposition rate | Printhead temperature | Heated bed temperature | Nozzle diameter | Layer thickness |
|---|---|---|---|---|---|
| TPU2 | 24 mm/s | 240° C. | 23° C. | 0.4 mm | 0.2 mm |
| PC | 30 mm/s | 285° C. | 90° C. | 0.4 mm | 0.2 mm |

The construction space of the FDM printer used is not encased; it follows that the construction space temperature was equal to room temperature (about 23° C.).

Test specimens of a first polymer that had width 160 mm, thickness 1 mm and length 300 mm were printed on the FDM printer. An identical test specimen of a second polymer was pressed onto the test specimen thus produced, with the last 50 mm of the lower test specimen covered by a sheet of paper so as to form an area of length 50 mm that was not in contact with the next layers of construction material.

Example 4: Peel Test on the Test Specimens

The bonded test specimens according to example 3 were cut into strips of width 30 mm and then clamped in a tensile tester and tested for adhesion strength in a 180° peel test to DIN EN ISO 11339. The peel force (N) was recorded over the peeling distance covered (mm). The integral beneath this curve corresponds to the work performed, with which the first construction material was separated from the second construction material. The results are shown in the table below. It can be seen that significantly more work had to be expended to separate the printed TPU2 layer from PC than a layer of PC from a layer of PC. It can be concluded from this that the interlayer adhesion between the two different construction materials is higher than the interlayer adhesion of PC with the printing parameters chosen.

| Construction material 1/2 | Work [J] |
|---|---|
| TPU2/PC | 2.3 |
| PC/PC | 0.4 |

The invention claimed is:
1. A process for producing an article in an additive manufacturing method with layers of different materials, comprising the steps of:
   I) providing a construction material heated at least to a temperature above its glass transition temperature on a carrier, such that a layer of the construction material is obtained, corresponding to a first selected cross section of the article;
   II) providing a construction material heated at least partly to a temperature above its glass transition temperature on a previously provided layer of the construction material, such that a further layer of the construction material is obtained, corresponding to a further selected cross section of the article and bonded to the previously provided layer;
   III) repeating step II) until the article is formed;
   wherein the construction material in each of the individual steps II) is selected from a first construction material and a second construction material different therefrom, wherein the absolute difference in the refractive indices $n^{20}_D$ between the first and second construction materials is ≥0.01, wherein the first construction material comprises a polycarbonate, polyester, polyestercarbonate, polyamide, polylactide, polyvinylchloride, polystyrene, polymethyl(meth)acrylate or mixtures of at least two of these, wherein step II) is conducted at least once with the first construction material and wherein step II) is conducted at least once with the second construction material.

2. The process as claimed in claim 1, wherein, in steps I) and II), providing the construction material comprises applying a filament of at least one construction material heated at least partly to a temperature above its glass transition temperature.

3. The process as claimed in claim 1, wherein, in steps I) and II), providing the construction material comprises introducing energy on a powder layer of the construction material.

4. The process as claimed in claim 1, wherein the number of steps II) using the first construction material is ≥80% to ≤120% of the number of steps II) using the second construction material.

5. The process as claimed in claim 1, wherein the first and second construction materials are used alternately in the steps II).

6. The process as claimed in claim 1, wherein the first construction material has a Vicat softening temperature of ≥150° C. to ≤220° C. according to DIN EN ISO 306, determined with a testing force of 50 N and a heating rate of 120 K/h.

7. The process as claimed in claim 1, wherein the second construction material has a Vicat softening temperature of ≥100° C. to ≤170° C. according to DIN EN ISO 306, determined with a testing force of 50 N and a heating rate of 120 K/h.

8. The process as claimed in claim 1, wherein the first construction material comprises a polycarbonate polymer having diphenol units derived from 4,4'-(3,3,5-trimethylcyclohexylidene)bisphenol.

9. The process as claimed in claim 1, wherein the second construction material comprises a polyamide, a polyurethane, a polyester, a polyether, a polyimide, a polyetherketone, a polycarbonate, a polyestercarbonate, a polyformal, a polyacrylate, a polyolefin, a polyvinylchloride, a polyoxymethylene, copolymers of at least two of these, or mixtures thereof.

10. The process as claimed in claim 1, wherein the second construction material comprises a thermoplastic polyurethane polymer.

11. The process as claimed in claim 10, wherein the second construction material comprises a thermoplastic polyurethane elastomer having a melting range of ≥20° C. to ≤240° C. differential scanning calorimetry; second heating at a heating rate of 5 K/min) and a Shore hardness of ≥40 A to ≤85 D according to DIN ISO 7619-1.

12. The process as claimed in claim 10, wherein the second construction material comprises a thermoplastic polyurethane elastomer obtained from the reaction of the following components:

a) at least one organic diisocyanate, b) at least one compound having isocyanate-reactive groups and having a number-average molecular weight of ≥500 g/mol to ≤6000 g/mol and a number-average functionality of the sum total of the components b) of ≥1.8 to ≤2.5, and c) at least one chain extender having a number-average molecular weight of 60-450 g/mol and a number-average functionality of the sum total of the chain extenders c) of 1.8 to 2.5.

13. The process as claimed in claim 10, wherein the construction material comprises a thermoplastic polyurethane elastomer obtained from the reaction of a polyisocyanate component and a polyol component, wherein the polyol component comprises a polyester polyol having a no-flow point of ≥25° C. to ≤100° C. according to ASTM D5985.

14. The process as claimed in claim 1, wherein the first construction material comprises a polycarbonate and the second construction material comprises a thermoplastic polyurethane polymer.

* * * * *

UNITED STATES PATENT AND TRADEMARK OFFICE
CERTIFICATE OF CORRECTION

PATENT NO. : 11,267,192 B2
APPLICATION NO. : 16/474176
DATED : March 8, 2022
INVENTOR(S) : Dirk Achten et al.

It is certified that error appears in the above-identified patent and that said Letters Patent is hereby corrected as shown below:

In the Claims

In Column 20, please replace Line 12 as follows:
$\leq 240°$ C (differential scanning calorimetry; second heating Signed and Sealed this
Twentieth Day of September, 2022

Katherine Kelly Vidal
*Director of the United States Patent and Trademark Office*